US008982707B2

(12) United States Patent  
Moreno et al.

(10) Patent No.: US 8,982,707 B2  
(45) Date of Patent: Mar. 17, 2015

(54) INTEROPERABILITY OF DATA PLANE BASED OVERLAYS AND CONTROL PLANE BASED OVERLAYS IN A NETWORK ENVIRONMENT

(71) Applicants: Victor Manuel Moreno, Carlsbad, CA (US); Ian Bruce Bernard Cox, Fremont, CA (US)

(72) Inventors: Victor Manuel Moreno, Carlsbad, CA (US); Ian Bruce Bernard Cox, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 13/829,233

(22) Filed: Mar. 14, 2013

(65) Prior Publication Data

US 2014/0269702 A1    Sep. 18, 2014

(51) Int. Cl.
*H04L 12/46* (2006.01)
*H04L 12/715* (2013.01)
*H04L 12/761* (2013.01)
*H04L 12/18* (2006.01)
*H04L 29/12* (2006.01)

(52) U.S. Cl.
CPC ............ *H04L 12/1881* (2013.01); *H04L 45/64* (2013.01); *H04L 61/2038* (2013.01)
USPC ............ 370/236; 370/390; 709/227; 709/249

(58) Field of Classification Search
CPC ............ H04L 12/4641; H04L 12/4679; H04L 12/4633; H04L 49/70; H04L 29/12009; H04L 29/12839; H04L 45/64; H04L 61/6022; H04L 12/18; H04L 12/46; H04L 2212/0025; H04L 43/00; H04L 43/12; H04L 43/04

USPC ......... 370/229, 231, 235, 236, 389, 390, 392, 370/400, 432; 709/227, 228, 242, 249
See application file for complete search history.

(56) References Cited

U.S. PATENT DOCUMENTS 6,640,251 B1 * 10/2003 Wiget et al. .................. 709/238  
8,565,076 B2 * 10/2013 Kovvali et al. ............... 370/229  
(Continued)

OTHER PUBLICATIONS

Cisco, "Cisco Nexus 1000V Series Switches" Data Sheet, © 2012, 20 pages; http://www.cisco.com/en/US/prod/collateral/switches/ps9441/ps9902/data_sheet_c78-492971.html.

(Continued)

*Primary Examiner* — Ahmed Elallam  
(74) *Attorney, Agent, or Firm* — Patent Capital Group

(57) ABSTRACT

Technologies are provided in example embodiments for intercepting a packet being multicast from a first tunnel endpoint in a network, determining first address mapping information of the first tunnel endpoint and a first host, wherein the first host created the packet, generating a control protocol message with the first address mapping information, and communicating the control protocol message through a control plane in the network. In more specific example embodiments, the communicating the control protocol message includes sending the control protocol message to a network repository, where the first address mapping information is registered in the network repository. In other more specific example embodiments, the communicating the control protocol message includes pushing the control protocol message to one or more other tunnel endpoints. Further embodiments include decapsulating the packet to determine an endpoint identifier of the first host and a location of the first tunnel endpoint.

20 Claims, 8 Drawing Sheets

(56) References Cited

U.S. PATENT DOCUMENTS

| | | | |
|---|---|---|---|
| 2004/0221042 A1* | 11/2004 | Meier | 709/227 |
| 2013/0145152 A1* | 6/2013 | Maino et al. | 713/156 |
| 2013/0318219 A1* | 11/2013 | Kancherla | 709/222 |
| 2014/0086253 A1* | 3/2014 | Yong | 370/395.53 |
| 2014/0192804 A1* | 7/2014 | Ghanwani et al. | 370/390 |
| 2014/0233569 A1* | 8/2014 | Yong et al. | 370/392 |
| 2014/0269712 A1* | 9/2014 | Kidambi | 370/392 |

OTHER PUBLICATIONS

Cisco, "Deploying the VXLAN Feature in Cisco Nexus 1000V Series Switches," Deployment Guide, May 2012, 19 pages; http://www.cisco.com/en/US/prod/collateral/switches/ps9441/ps9902/guide_c07-702975.html.

Cisco Systems, Inc., "Locator/ID Separation Protocol (LISP)—Cisco Systems, Inc.," LISP Overview Page, © 1992-2011, 5 pages; http://lisp.cisco.com/lisp_over.html.

D. Farinacci, et al., The Locator/ID Separation Protocol (LISP), IETF, RFC 6830, Jan. 2013, 75 pages; http://tools.ietf.org/pdf/rfc6830.pdf.

Cisco, "Scalable Cloud Networking with Cisco Nexus 1000V Series Switches and VXLAN," http://www.cisco.com/en/US/prod/collateral/switches/ps9441/ps9902/white_paper_c11-685115.html.

* cited by examiner

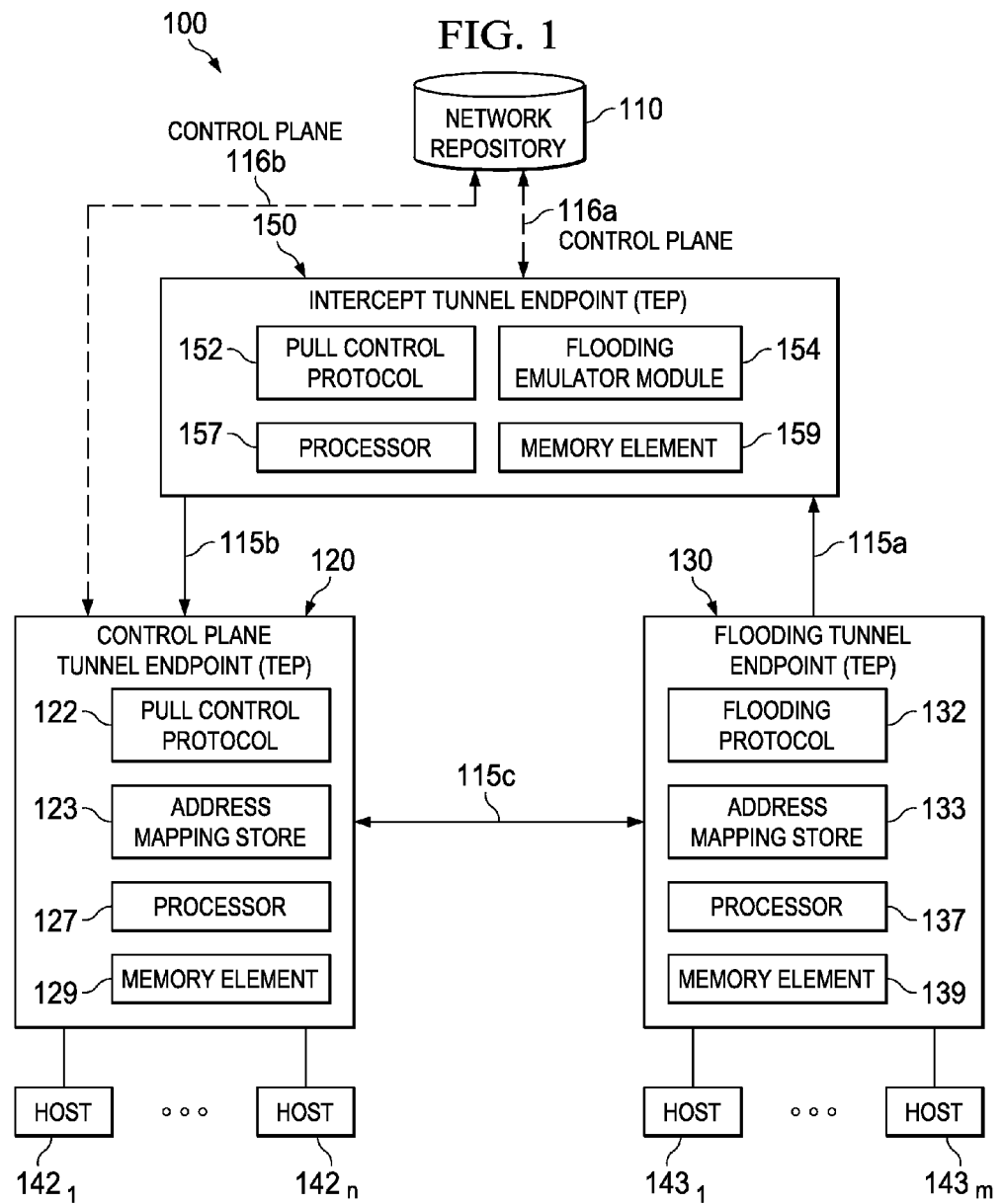

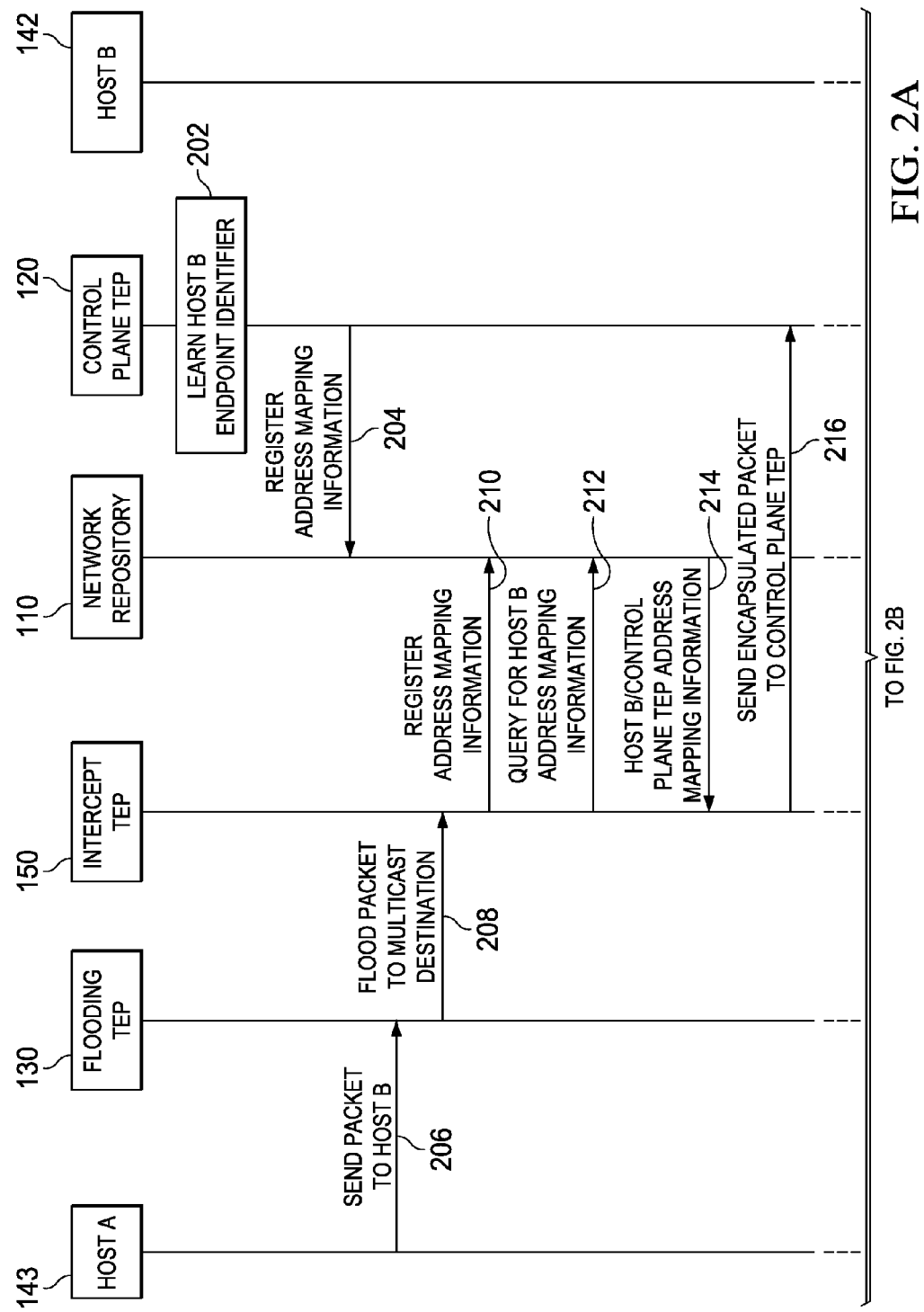

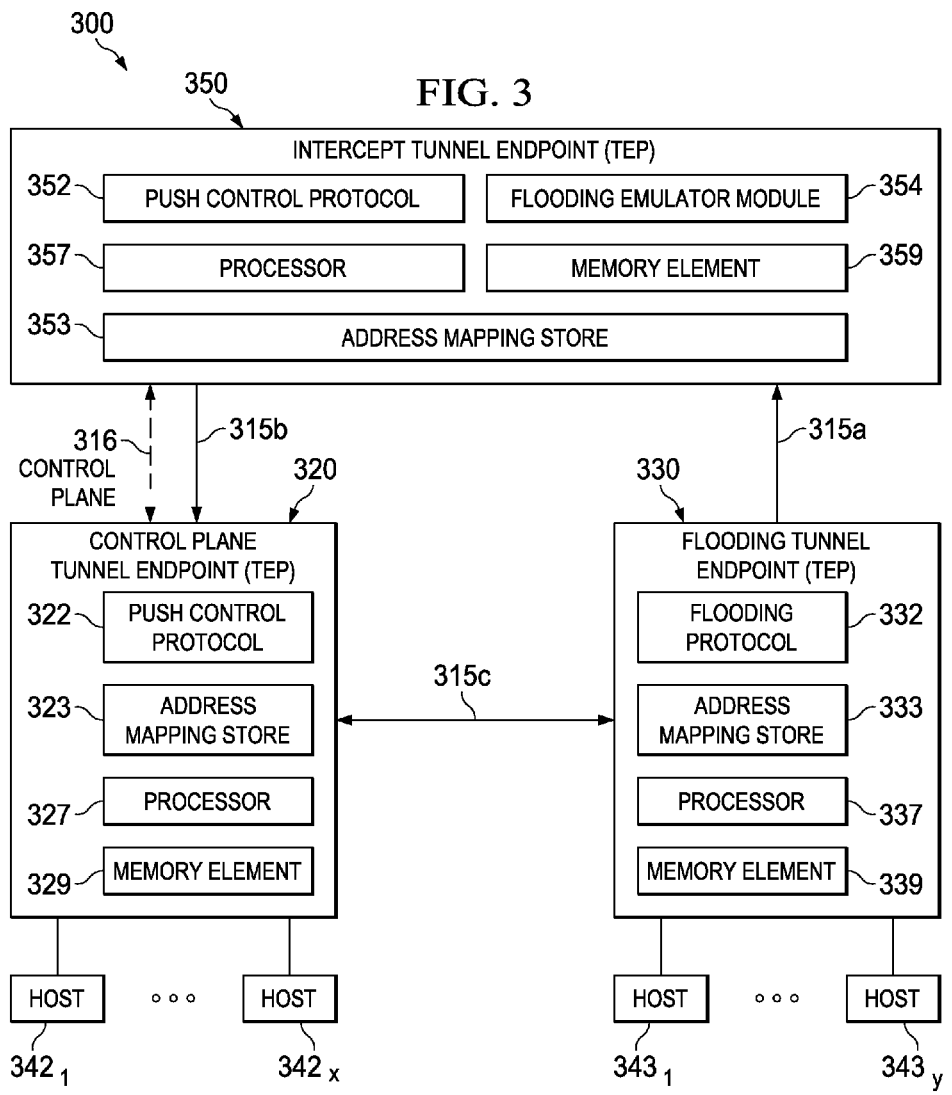

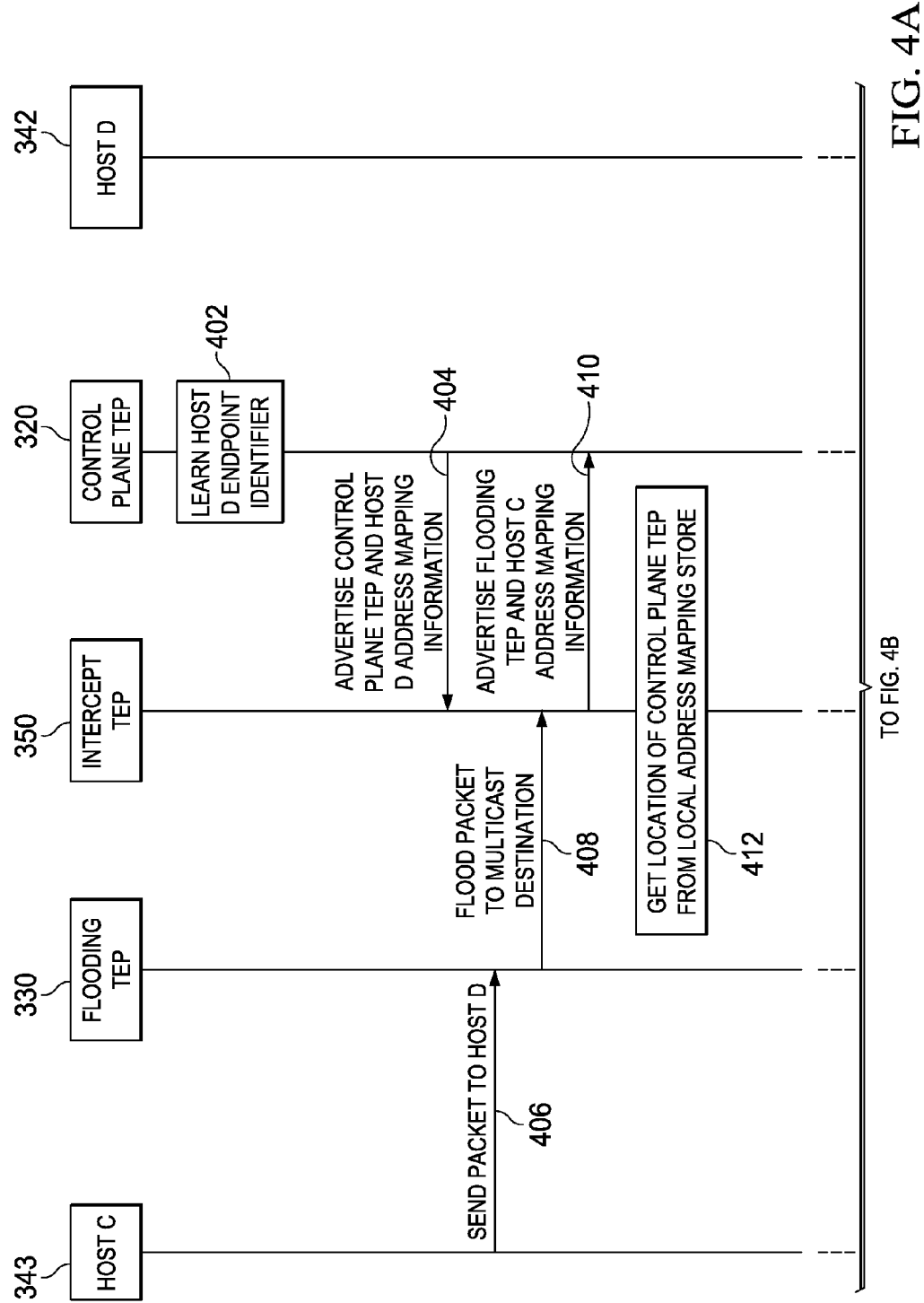

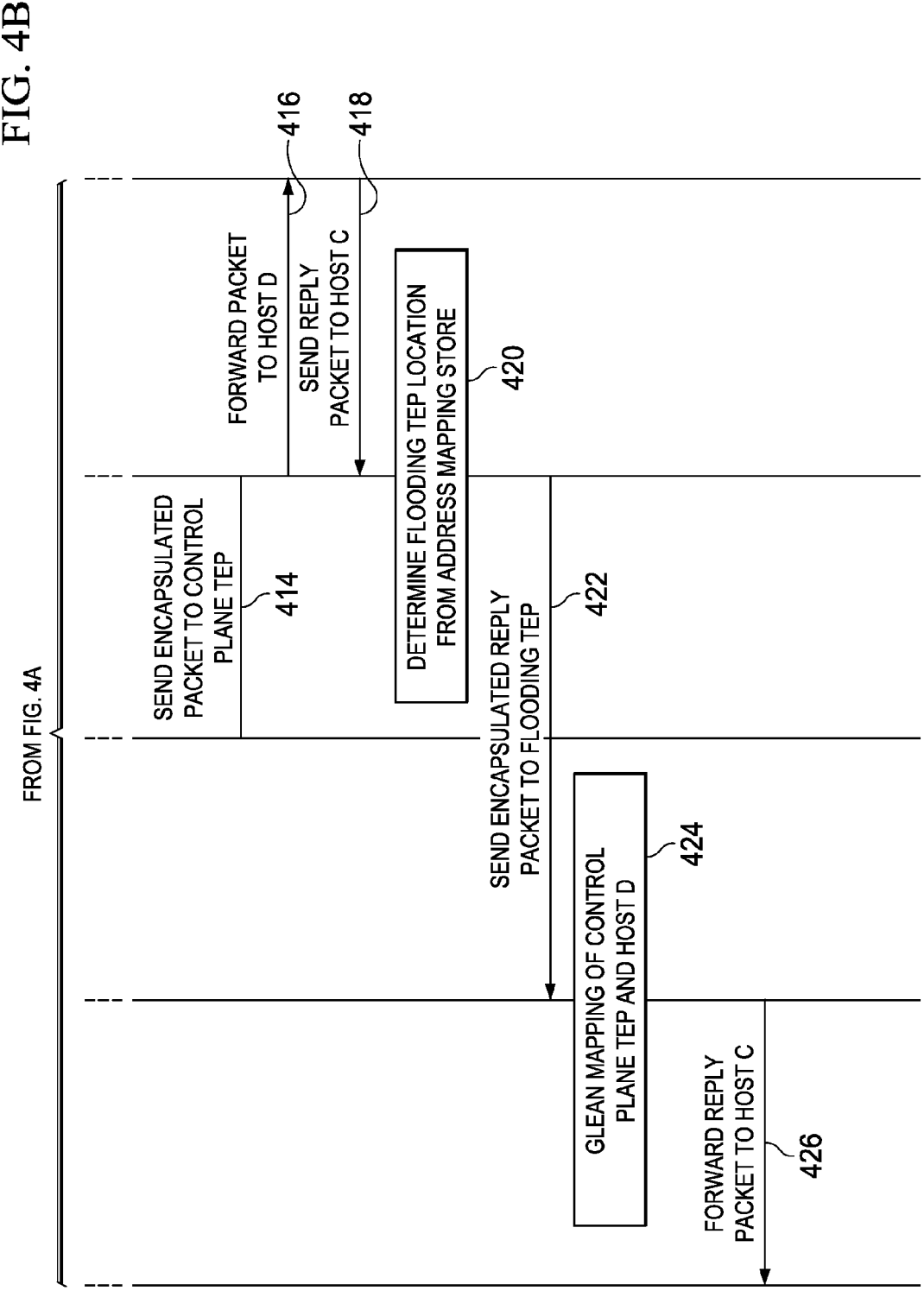

US 8,982,707 B2

INTEROPERABILITY OF DATA PLANE BASED OVERLAYS AND CONTROL PLANE BASED OVERLAYS IN A NETWORK ENVIRONMENT

TECHNICAL FIELD

This disclosure relates in general to the field of networking, and more particularly, to interoperability of data plane based overlays and control plane based overlays in a network environment.

BACKGROUND

Networking architectures have grown increasingly complex in communication environments. Local area networks (LANs) can be configured with network overlays, which are logical topologies between different endpoints in the LAN. A logical topology refers to the arrangement of devices in a network and how they communicate across the physical connections. Many network overlays rely on data plane flooding and gleaning of data plane events to learn the mapping between a host address and an overlay endpoint address. A virtual extensible local area network (VXLAN) is an example of such an overlay. A VXLAN is an encapsulation protocol for running an overlay network on existing Layer 3 infrastructure. VXLANs can provide scalability so that millions of isolated Layer 2 VXLAN networks can coexist on a common Layer 3 infrastructure. VXLANs typically include tunnel endpoints (TEPs) in virtual switches. However, VXLANs also may include tunnel endpoints in physical switches. Flooding and gleaning data plane events can use significant network resources and may provide opportunities for malicious software to disrupt the normal operations of the network. Other protocols may also be implemented in a VXLAN to learn the mapping between hosts and tunnel endpoints, but they may not be interoperable with flooding. Thus, the ability to scale networks using network overlays, while maintaining security against malicious software attacks, and without unnecessarily consuming network resources, can present significant challenges for network operators and component manufacturers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a simplified block diagram of a communication system providing interoperability of data plane and control plane based network overlays in a network environment according to at least one embodiment;

FIGS. 2A and 2B show an interaction diagram illustrating interactions in the communication system according to at least one embodiment;

FIG. 3 is a simplified block diagram of a communication system providing interoperability of data plane and control plane based network overlays in a network environment according to another embodiment;

FIGS. 4A and 4B show an interaction diagram illustrating interactions in the other communication system according to at least one embodiment;

DETAILED DESCRIPTION OF EXAMPLE EMBODIMENTS

Overview

Figure 2B:
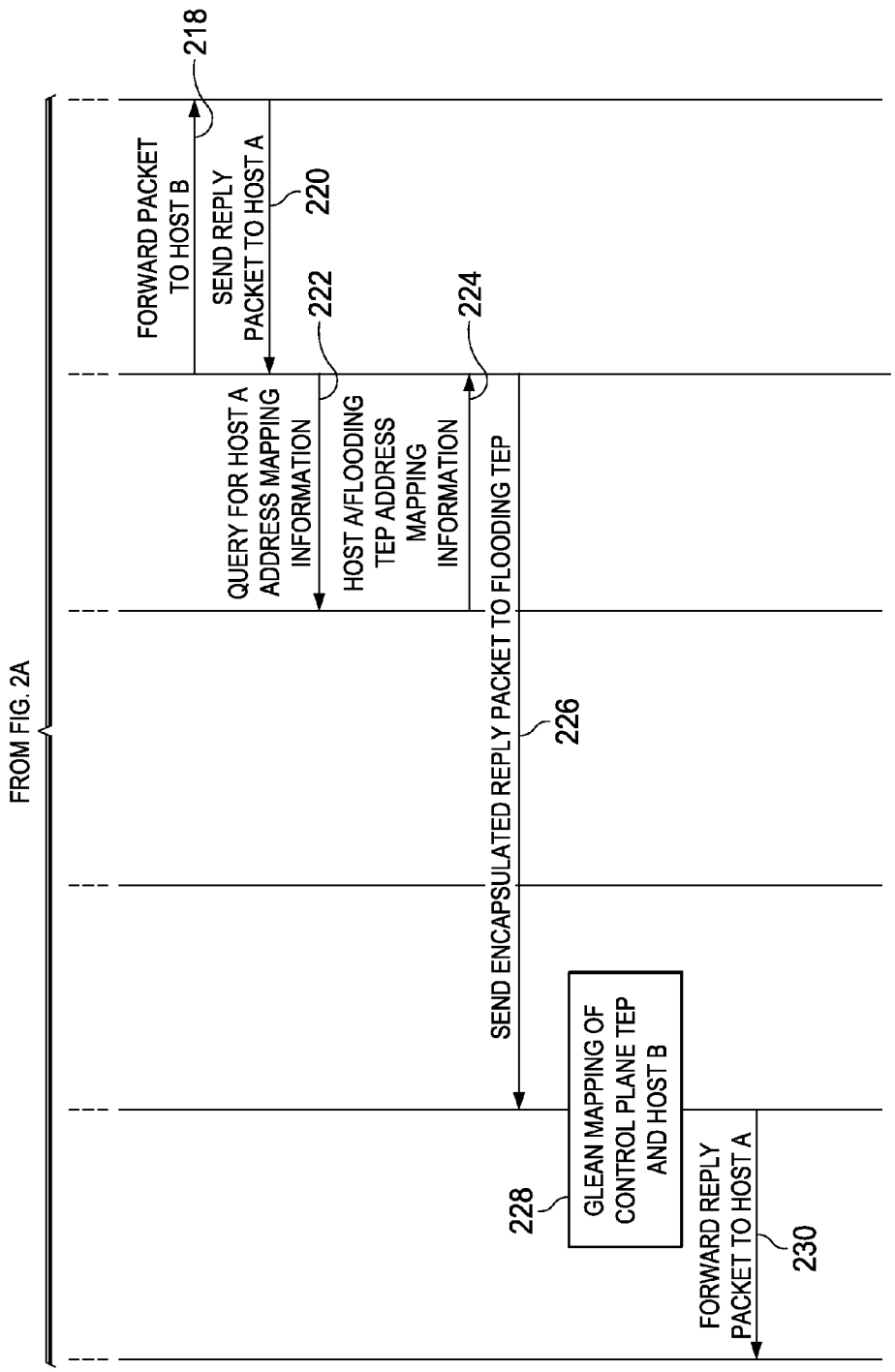

An aspect of the subject matter described in this specification can be embodied in methods that include the activities of intercepting a packet being multicast from a first tunnel endpoint in a network. The methods can further include determining first address mapping information of the first tunnel endpoint and a first host, where the first host created the packet. The methods can also include generating a control protocol message with the first address mapping information, and communicating the control protocol message through a control plane in the network.

In another general aspect of the subject matter in this specification, at least one machine readable storage medium can be provided, having instructions stored therein, and the instructions when executed by a processor can cause the processor to intercept a packet being multicast from a first tunnel endpoint in a network. The instructions can also cause the processor to determine first address mapping information of the first tunnel endpoint and a first host, where the first host created the packet. The instructions can further cause the processor to generate a control protocol message with the first address mapping information, and communicate the control protocol message through a control plane in the network.

In yet another general aspect of the subject matter disclosed in this specification, an apparatus can be provided, comprising at least one memory element with instructions stored therein, and at least one processor. The instructions, when executed by the at least one processor, can cause the processor to intercept a packet being multicast from a first tunnel endpoint in a network. The instructions can also cause the processor to determine first address mapping information of the first tunnel endpoint and a first host, where the first host created the packet. The instructions can further cause the processor to generate a control protocol message with the first address mapping information, and communicate the control protocol message through a control plane in the network.

These and other embodiments can optionally include one or more of the following features. Communicating the control protocol message can include sending the control protocol message to a network repository, where the first address mapping information is registered in the network repository. In other embodiments, communicating the control protocol message can include pushing the control protocol message to one or more other tunnel endpoints. The packet can be decapsulated to determine an endpoint identifier of the first host and a location of the first tunnel endpoint. A second tunnel endpoint corresponding to a second host can be configured to receive the first address mapping information through the control plane, where the second host is identified in the packet as a destination of the packet. A determination can be made as to whether second address mapping information of the second host and the second tunnel endpoint is known, and, if the second address mapping information is known, then the packet can be sent to the second tunnel endpoint. A determination as to whether the second address mapping information is known can include one of querying a network repository and searching a local address mapping store. The packet can be encapsulated with a location of the second tunnel endpoint before the packet is sent to the second tunnel endpoint. The second tunnel endpoint can be configured to determine whether the first address mapping information is known when the second tunnel endpoint receives a second packet from the second host with the first host identified in the second packet as a destination of the second packet. The second tunnel endpoint can be configured to send the second packet directly to the first tunnel endpoint, if the second tunnel endpoint determines the first address mapping information is known.
Example Embodiments Turning to FIG. 1, FIG. 1 is a simplified block diagram of a communication system 100 for providing interoperability of data plane based overlays and control plane based overlays in a network environment. Communication system 100 illustrates an embodiment using a pull mechanism in the control plane based overlay. FIG. 1 includes a flooding tunnel endpoint (flooding TEP) 130, an intercept tunnel endpoint (intercept TEP) 150, and a control plane tunnel endpoint (control plane TEP) 120. Flooding tunnel endpoint 130 implements a flooding protocol 132, and may have an address mapping store 133. Control plane tunnel endpoint 120 and intercept tunnel endpoint 150 may implement, respectively, pull control protocols 122 and 152. Control plane tunnel endpoint 120 may also include a local address mapping store 123. Intercept tunnel endpoint 150 may also include a flooding emulator module 154. One or more hosts $142_{1-n}$ may be connected to control plane tunnel endpoint 120, and one or more other hosts $143_{1-m}$ may be connected to flooding tunnel endpoint 130. For ease of reference and where appropriate, an example host of hosts $142_{1-n}$ may be referred to as host 142, and an example host of hosts $143_{1-m}$ may be referred to as host 143.

Communication system 100 may also include a network repository 110. Intercept TEP 150 and control plane TEP 120 may establish and use a control plane having communication paths 116a and 116b to communicate with network repository 110. A data plane having communication paths 115a and 115b can be established for communications between flooding TEP 130 and intercept TEP 150, and between intercept TEP 150 and control plane TEP 120. A data plane communication path 115c may also be established between control plane TEP 120 and flooding TEP 130 after intercept TEP 150 enables direct communication between them. Each tunnel endpoint 120, 130, and 150 can also include, but is not limited to, hardware such as processors 127, 137, and 157, and memory elements 129, 139, and 159.

For purposes of illustrating certain example techniques of communication system 100, it is important to understand the communications that may be traversing the network and the protocols used in effecting such communications. The following foundational information may be viewed as a basis from which the present disclosure may be properly explained.

Network overlays forward traffic based on two tiers of information: an overlay tier and an underlay tier. The underlay tier defines how network devices can reach each other and is commonly used in traditional networking. In the overlay model, the underlay protocol does not carry information about hosts connected to the network, but may include only information about the reachability of the different network devices in the topology. The overlay tier maps the different hosts connected to the network to an attachment point in the network. The attachment point could be a physical network device or a virtual device (e.g., a virtual switch) to which they are attached. A 'virtual switch' is intended to mean a virtual switching element within a hypervisor. This attachment point is often referred to as the 'tunnel endpoint' (TEP). Each tunnel endpoint in a network has a particular location, which can be a network address such as, for example, an Internet Protocol (IP) address. An attached host is often referred to as 'host endpoint', with an endpoint identifier (EID). As used herein, an endpoint identifier (or EID) can be a host endpoint's network address or other identifying information (e.g., a Virtual Station Interface (VSI)). Examples of EIDs include, but are not limited to, IP addresses, media access control (MAC) addresses, and hostnames. In at least one embodiment, EIDs could be determined by using Domain Name System (DNS) names, and a level of indirection before retrieving a final EID address.

A multitude of network overlays rely on data plane flooding and gleaning of data plane events to learn the mapping between a host endpoint address and the tunnel endpoint address. A popular example of such overlay is a virtual extensible local area network (VXLAN). In this model, tunnel endpoints join a common flood distribution tree. The tunnel endpoints learn the mappings for different hosts by gleaning the host EIDs and locations of corresponding tunnel endpoints from the source addresses in the inner and outer headers of the received traffic. This flood mechanism has the disadvantage of consuming a potentially significant amount of core bandwidth in the network. Additionally, the flood mechanism typically requires a flood domain that is also an open channel. This can enable unrestrained layer 2 storms and even malicious code that results in denial of service in the network.

Additionally, in order for a flood and glean method to work well, elements involved in the overlay are virtualized and a virtual switch in each hypervisor supports the overlay endpoint function. In a real world network implementation, however, it is often desirable to include support for non virtualized devices (i.e., physical devices) in the overlay. In order to do so incrementally, the network needs to provide the overlay functions of encapsulation, decapsulation, and learning on behalf of the physical devices. Providing this service in the network poses challenges that do not necessarily apply to single attached virtual endpoints for which VXLAN was initially designed. In particular, a network based flood and glean overlay may require a control protocol to work properly in a resilient network. Consequently, in order for a VXLAN to provide connectivity between physical and virtual devices in what is a hybrid between a host based overlay and a network based overlay, a control protocol may be required. Implementation of a control protocol for such networks with both physical and virtual devices, however, may not be economically or logistically desirable.

Example embodiments of a communication system, as described herein, can resolve the aforementioned issues associated with the lack of interoperability between data plane based overlays and control plane based overlays. More specifically, example embodiments of a communication system provide an interworking solution to allow flooding tunnel endpoints to participate in the same network overlay as control plane tunnel endpoints. In other words, a new network overlay is created in which some tunnel endpoints use a flooding protocol and other tunnel endpoints use a control protocol, without necessarily modifying these tunnel endpoints. The control protocol maintains mappings between locations (e.g., network addresses) of tunnel endpoints and endpoint identifiers of their attached hosts communicating across the network. These mappings can be learned via a control plane. Each of the flooding tunnel endpoints, however, may maintain mappings between locations of other tunnel endpoints and endpoint identifiers of their attached hosts.

Interoperability between a control plane based overlay and a data plane based overlay can be provided by an intercept device that is configured to intercept traffic from a flooding tunnel endpoint and to communicate with the control plane. In at least one embodiment, the intercept device can be a tunnel endpoint with a control protocol. In order to allow a flooding tunnel endpoint to participate in the control plane based overlay, the intercept tunnel endpoint intercepts network traffic from the flooding tunnel endpoint, extracts information from the data plane headers of the network traffic, and sends the information to the control plane. In at least one embodiment, the extracted information is address mapping information that includes an endpoint identifier of the source host of the network traffic and a location of the corresponding flooding tunnel endpoint. Sending the address mapping information to the control plane can include registering the information with a network repository or advertising the information to other tunnel endpoints. The intercept tunnel endpoint may also determine a location of another tunnel endpoint attached to another host identified as the destination of the intercepted network traffic. If the location is determined, the intercept tunnel endpoint can package the network traffic with the location, and send the repackaged network traffic to the tunnel endpoint of the destination host. A common encapsulation technique between the control plane based overlay and the data plane based overlay allows end-to-end overlay connectivity without providing a data plane translation gateway. Thus, interworking may only be needed for the control plane.

Turning to the infrastructure of FIG. 1, communication system 100 represents a series of points or nodes of interconnected communication paths for receiving and sending communications that propagate through the system. Nodes of FIG. 1 may be coupled to one another through one or more virtual or physical interfaces employing any suitable connection (wired or wireless), which provides a viable pathway for electronic communications. The teachings of this disclosure can be implemented in many different types or topologies of networks including, but not limited to, a local area network (LAN), wireless local area network (WLAN), Intranet, Extranet, virtual local area network (VLAN), virtual private network (VPN), virtual extensible local area network (VXLAN), virtual private LAN service (VPLS), or any other appropriate architecture or system that facilitates communications in a network environment and in which both data plane based overlays and control plane based overlays may be implemented. For ease of explanation, 'data plane based overlays' are alternately referred to herein as 'flood based overlays'.

Communications in a network environment are referred to herein as 'network traffic' or 'traffic', which may be inclusive of packets. A packet is a formatted unit of data, and can contain both control information (e.g., source and destination addresses, etc.) and data, which is also known as payload. A single communication from a source host to a destination host, such as an electronic mail message for example, may be broken up into multiple discrete packets with different payloads.

Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are forms of network traffic, and therefore, may comprise packets.

In at least one embodiment, hosts $142_{1-n}$ and $143_{1-m}$ are attached to control plane tunnel endpoint 120 and flooding tunnel endpoint 130, respectively. Control plane tunnel endpoint 120 and flooding tunnel endpoint 130 provide network access to hosts $142_{1-n}$ and $143_{1-m}$ respectively. Hosts $142_{1-n}$ and $143_{1-m}$ are intended to include electronic devices used to communicate in a network environment. Examples of hosts include, but are not limited to personal computers, laptops, smart phones, mobile devices, tablets, servers, appliances, printers, smart appliances or any other devices, components, elements, or objects capable of initiating and/or receiving voice, audio, video, media, or data exchanges within communication system 100. One or more of hosts $142_{1-n}$ and $143_{1-m}$ may also be inclusive of a suitable interface for a human user, such as a display, a keyboard, a touchpad, a remote control, or other terminal equipment. One or more of hosts $142_{1-n}$ and $143_{1-m}$ may also include any device that seeks to initiate a communication on behalf of another entity or element, such as a program, a database, or any other component, device, element, or object capable of initiating an exchange within communication system 100.

Control plane tunnel endpoint 120, flooding tunnel endpoint 130, and intercept tunnel endpoint 150 are virtual or physical switches or other network elements that include switching functions and that facilitate electronic communication with hosts in a given network. As used herein, the term 'network element' is meant to encompass routers, switches, wireless access points (WAPs), gateways, bridges, loadbalancers, appliances, firewalls, servers, processors, modules, or any other suitable device, component, element, proprietary appliance, or object operable to exchange information in a network environment. A network element may include any suitable hardware, software, components, modules, interfaces, or objects that facilitate the operations thereof. This may be inclusive of appropriate algorithms and communication protocols that allow for the effective exchange of data or information. In many instances, flooding tunnel endpoints, such as flooding TEP 130, are virtual switches in hypervisors, and control plane endpoints, such as control plane TEP 120 and intercept TEP 150, are physical switches. In other instances, however, one or more flooding tunnel endpoints may be physical switches, and/or one or more control plane tunnel endpoints may be virtual switches.

In at least one example implementation, tunnel endpoints 120, 130, and 150 include logic to achieve (or to foster) the activities that enable data plane and control plane based overlay interoperability, as outlined herein. Note that in at least one example, each of these elements can have an internal structure (e.g., processors 127, 137, 157, memory elements 129, 139, 159, etc.) to facilitate some of the operations described herein. In other embodiments, these activities that enable overlay interoperability may be executed externally to these elements, or included in some other network element to achieve this intended functionality. In at least one embodiment tunnel endpoints 120, 130, and/or 150 may include this logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In at least one embodiment of communication system 100, a new network overlay is created in which some components use a flooding protocol and some components use a control protocol. This new network overlay enables interoperability between a control plane based overlay, created by components having a control protocol, and a data plane (or flood) based overlay, created by components having a flooding protocol.

In communication system 100, one or more flooding tunnel endpoints, such as flooding TEP 130, implement a flooding protocol, such as flooding protocol 132. The flooding protocol may be any flooding protocol (e.g., VXLAN flooding protocol) that relies on data plane flooding and gleaning of data plane events to learn the mapping between hosts and tunnel endpoints. Flooding tunnel endpoints also apply some type of encapsulation to network traffic. Flooding protocol 132 may be implemented as hardware, software, firmware, or any suitable combination thereof.

With flooding protocol 132, flooding TEP 130 learns address mapping information of different hosts (e.g., hosts 142$_{1-n}$) in the network by gleaning EIDs of the hosts and locations of their corresponding tunnel endpoints from inner and/or outer headers of received network traffic. In at least one example embodiment, flooding tunnel endpoint 130 can store address mapping information of hosts and corresponding tunnel endpoints in local address mapping store 133. An example of address mapping information that could be stored in address mapping store 133 is an EID of host 142$_1$ mapped to a network address of control plane tunnel endpoint 120. Additionally, address mapping information for each host-to-TEP mapping in the network, including hosts in the control plane based overlay and hosts in the data plane based overlay, may be stored in address mapping store 133 once flooding TEP 130 learns the address mapping information. Address mapping store 133 may be provided in the form of one or more databases, tables, caches, files, repositories, or any other suitable storage structure, or any suitable combination thereof. Address mapping store 133 may be internal to flooding TEP 130 or external (entirely or in part). In addition, address mapping store 133 may use any suitable mapping, marking, or linking technique (e.g., pointers, indexes, file names, relational databases, hash tables, etc.), or any other technique that represents a relation, connection, link, or the like between the mapped items.

Communication system 100 includes a control plane based overlay defined by one or more control plane tunnel endpoints, such as control plane TEP 120, and at least one intercept tunnel endpoint, such as intercept TEP 150. In at least one embodiment, control plane TEP 120 and intercept TEP 150 each implement a control protocol, including the same type of encapsulation used by flooding TEP 130. A control protocol may be implemented as hardware, software, firmware, or any suitable combination thereof.

In the example embodiment of FIG. 1, control protocols in control plane TEP 120 and intercept TEP 150 implement a pulling mechanism for enabling tunnel endpoints that participate in the control plane based overlay to learn the topology of the network. This topology may be learned using a control plane with communication paths, such as paths 116a-b. The control plane may be used to distribute address mapping information of hosts and their corresponding tunnel endpoints, through network repository 110.

Using pull control protocol 122, when control plane TEP 120 learns about a local presence of a host, such as host 142, control plane TEP 120 can issue a control protocol message to register address mapping information of the host and control plane TEP 120 with network repository 110. In at least one embodiment that implements a pull mechanism, address mapping information is registered with network repository 110 using the control plane, but is not pushed to other tunnel endpoints participating in the control plane based overlay. When a tunnel endpoint with a pull control protocol needs reachability information for a remote host, the tunnel endpoint can request this information from network repository 110 through the control plane. Thus, the tunnel endpoint can 'pull' address mapping information from network repository 110 on-demand.

In at least one embodiment, when control plane TEP 120 pulls address mapping information from network repository 110, it can store the address mapping information in address mapping store 123. Address mapping store 123 and mapping techniques used therein, may be configured in the same or similar manner as described with reference to address mapping store 133 of flooding TEP 130.

In intercept TEP 150, a flooding emulator module 154 may cooperate with pull control protocol 152 to achieve interoperability between the flood based overlay and the control plane based overlay. Intercept TEP 150 can intercept network traffic being multicast from one or more flooding tunnel endpoints, such as flooding TEP 130. Intercept TEP 150 can decapsulate an intercepted packet to determine address mapping information of a source host of the packet and its corresponding flooding tunnel endpoint. A 'source host' as used herein is intended to refer to a host that is the source or creator of a packet of network traffic. A 'destination host' is intended to refer to a host that is the final destination of a packet. In at least one embodiment, intercept TEP 150 can register the address mapping information with network repository 110 via communication path 116a of the control plane.

Intercept TEP 150 may be configured to query network repository 110 to obtain address mapping information of a destination host of an intercepted multicast packet. If address mapping information of the destination host and its corresponding tunnel endpoint has previously been registered, then intercept TEP 150 can receive a reply with the requested address mapping information and can repackage (also referred to herein as 'encapsulate') the packet with the location of the corresponding tunnel endpoint. For example, assume host 143$_1$ sends a packet to host 142$_1$, and also assume a MAC address of host 142$_1$ and an IP address of its corresponding tunnel endpoint, control plane TEP 120, have already been registered in network repository 110. In this example scenario, when intercept TEP 150 intercepts the packet, intercept TEP 150 can decapsulate the packet and query network repository 110 for address mapping information. The query can be based on the MAC address of destination host 142$_1$, which is gleaned from the packet's inner header. Intercept TEP 150 may then receive the address mapping information containing the IP address for control plane TEP 120, repackage the packet with the IP address, and send the packet to control plane TEP 120 via communication path 115b of the data plane.

In at least one embodiment, network repository 110 comprises one or more nodes that are not necessarily tunnel endpoints. For example, network repository 110 could include one or more storage elements, such as distributed databases, in which address mapping information may be stored and retrieved upon request. In at least one embodiment, storage elements could be included in network elements and/or could be implemented using some network storage technique such as network attached storage (NAS) or a storage area network (SAN). In at least some embodiments, network repository 110 may reside in memory of an intercept switch (e.g., intercept TEP 150) or one or more control plane tunnel endpoints (e.g., control plane TEP 120). Generally, network repository 110 may reside in any network element with sufficient memory and accessibility to tunnel endpoints in communication system 100.

In at least one embodiment, pull control protocol could be implemented as Locator/Identifier Separation Protocol (LISP) in which address mapping information can be formally registered by informing a mapping system that pushes the address mapping information to a network repository, which may be configured as distributed databases. LISP is a network architecture and set of protocols that implements a semantic for IP addressing using endpoint identifiers (EIDs), which are assigned to end-hosts, and Routing Locators (RLOCs), which are assigned to devices (e.g., routers, switches) that make up the routing system. LISP is more fully explained in Requests for Comments (RFC) 6830 entitled, "The Locator/ID Separation Protocol (LISP)," by Farinacci, D., Fuller, V., Meyer, D., and D. Lewis, dated January 2013. LISP standards are being developed as open standards within the Internet Engineering Task Force (IETF) LISP Working Group. Accordingly, in an example embodiment using LISP, address mapping information could include an RLOC-to-MAC mapping. In other embodiments, different protocols with a pull mechanism could be used including, but not limited to, RxControl.

To enable interoperability of the overlays, in at least one embodiment of communication system 100, the control plane based overlay and the data plane based overlay are established using the same type of encapsulation for network traffic. By way of example, but not limitation, some type of Internet Protocol (IP) encapsulation may be used in at least some embodiments. For instance, VXLAN is an IP encapsulation protocol for running an overlay network on existing Layer 3 infrastructure. In VXLAN, a first tunnel endpoint on a host encapsulates a packet it receives from an application of the host. Encapsulation gives the received network traffic an additional header so that the traffic travels from an address that identifies the first tunnel endpoint to an address that identifies the tunnel endpoint to which the destination host is attached. Thus, VXLAN encapsulation results in the packet being forwarded between tunnel endpoints rather than between terminal endpoints, or hosts. When a tunnel endpoint receives network traffic in the form of an encapsulated packet, the packet is decapsulated such that the outer header is removed. The endpoint identifier of the destination host may be in an original header of the packet, which can be examined once the network traffic is decapsulated. Thus, the tunnel endpoint that decapsulates the packet can then forward the packet to the destination host. In a typical VXLAN, network addresses of tunnel endpoints are Internet Protocol (IP) addresses and endpoint identifiers of communicating hosts are media access control (MAC) addresses. The principles disclosed herein, however, may be applied to any combination of address families.

In another example, communication system 100 could be implemented in a Virtual Private LAN Service (VPLS), with a data plane based overlay and a control plane based overlay having a common IP encapsulation. VPLS is a virtual private network (VPN) technology that allows multipoint to multipoint communication over Internet Protocol/Multiprotocol Label Switching (IP/MPLS) networks.

FIGS. 2A and 2B show an interaction diagram illustrating interactions associated with at least one embodiment of communication system 100, which provides interoperability between a flood based overlay and a control plane based overlay. The example of FIGS. 2A and 2B is merely an example of potential interactions, and does not limit the scope of the claims. For example, number of modules may vary, number of components may vary, specific interactions may vary, order of interactions may vary, etc.

The example of FIGS. 2A and 2B illustrates an example of interactions between host 143 (referred to as 'host A' for ease of illustration), flooding TEP 130, intercept TEP 150, network repository 110, control plane TEP 120, and host 142 (referred to as 'host B' for ease of illustration). Initially, when tunnel endpoints of communication system 100 come online, they are made aware of attached hosts in the network. At 202, control plane TEP 120 comes online and learns an endpoint identifier (EID) of attached hosts, such as host B. This learning can be accomplished using any number of techniques. For example, a management station may send out address information, specific protocols may be defined for providing notifications to a virtual switch (e.g., virtual host discovery protocol (VDP)), or incoming packets from attached hosts may be examined for source address information.

When control plane TEP 120 learns the EID of host B, at 204, control plane TEP can register address mapping information with network repository 110. For example, control plane TEP 120 could issue a control protocol message in the form of a registration message containing the address mapping information. Control plane TEP 120 could send the control protocol message through the control plane, to a mapping server that is part of network repository 110. Address mapping information can include an endpoint identifier of host B mapped to a location of the tunnel endpoint requesting the registration, which is control plane TEP 120 in this scenario. In at least one embodiment, the endpoint identifier of host B could be a MAC address, and the location of control plane TEP 120 could be an IP address. Although registration of address mapping information by control plane TEP 120 is indicated in the interaction diagram of FIGS. 2A and 2B as occurring before other interactions, in other scenarios, this registration may not occur until after certain other interactions shown in FIGS. 2A and 2B.

At 206, host A sends a packet that includes an endpoint identifier of the destination of the packet, host B. In at least one embodiment, the packet is one of one or more packets of network traffic created by host A to send a message to host B. In at least one embodiment, an endpoint identifier of host B may be encapsulated in an inner header of the packet. When flooding TEP 130 receives the packet from host A, it prepares the packet for multicast flooding. In at least one embodiment, flooding TEP 130 encapsulates the packet by adding an outer header with a multicast destination address and its own network address to indicate the location that sent the encapsulated packet. Then, at 208, flooding TEP 130 attempts to flood the network by sending the packet with the multicast address via communication path 115a of the data plane.

Intercept TEP 150 intercepts the multicast packet. Intercept TEP 150 can determine the location of the tunnel endpoint that sent the multicast packet, which is flooding TEP 130 in this scenario. In at least one embodiment, the location can be determined by gleaning a network address from an outer header of the packet. Intercept TEP 150 can decapsulate the packet to determine an endpoint identifier of the source of the network traffic, which is host A in this scenario. Once intercept TEP 150 determines the address mapping information of host A and flooding TEP 130, then at 210, intercept TEP 150 can send a control protocol message in the form of a registration message, through the control plane, to network repository 110 to register the address mapping information.

Intercept TEP 150 can also examine the decapsulated packet to determine an endpoint identifier of the destination of the network traffic, which is host B in this scenario. At 212, intercept TEP 150 can query network repository 110, via communication path 116a of the control plane, to determine whether address mapping information of host B and its corresponding tunnel endpoint is known. In this example interaction scenario, control plane TEP 120 previously registered, at 204, address mapping information of host B and control plane TEP 120. Therefore, network repository 110 can send a reply at 214, to intercept TEP 150, providing address mapping information of host B and its corresponding tunnel endpoint, control plane TEP 120.

Intercept TEP 150 can determine the location of control plane TEP 120 from the address mapping information received in the reply from network repository 110. Intercept TEP 150 can encapsulate the packet with the location of control plane TEP 120. In at least one embodiment, the encapsulation can include adding an outer header to the packet, with the outer header containing the location of control plane TEP 120. At 216, intercept TEP 150 can send the encapsulated packet to control plane TEP 120 via communication path 115b of the data plane.

When control plane TEP 120 receives the encapsulated packet, it can decapsulate the packet to identify the particular host that is the destination of the packet. At 218, control plane TEP 120 can forward the packet to the identified host, which is host B in this interaction scenario.

At 220, host B may send a reply packet to host A. The reply packet may include an endpoint identifier of host A as the destination. In at least one embodiment, the reply packet can be one of one or more packets of network traffic created by host B to send a reply to host A. In other interaction scenarios, the network traffic could be a message from host B to host A that is not necessarily associated with any previous communication from host A to host B.

When control plane TEP 120 receives the reply packet, it can identify host A as the destination of the reply packet. At 222, control plane TEP 120 can query network repository 110, to determine whether address mapping information of host A and its corresponding tunnel endpoint is known. In this example interaction scenario, intercept TEP 150 previously registered, at 210, address mapping information of host A and flooding TEP 130. Therefore, network repository 110 can send a reply at 224, to control plane TEP 120, providing address mapping information of host A and its corresponding tunnel endpoint, flooding TEP 130.

Control plane TEP 120 can determine the location of flooding TEP 130 from the address mapping information received in the reply from network repository 110. Control plane TEP 120 can prepare the reply packet to be sent directly to flooding TEP 130 by encapsulating the packet with the location of flooding TEP 130. In at least one embodiment, the encapsulation can include adding an outer header to the reply packet, with the outer header containing a network address of flooding TEP 130. At 226, control plane TEP 120 can send the encapsulated reply packet directly to flooding TEP 130 via communication path 115c of the data plane.

Control plane TEP 120 can also update address mapping store 123 with the address mapping information received from network repository 110. Accordingly, subsequent network traffic that is received by control plane TEP 120 and addressed to host A, can be encapsulated and sent to flooding TEP 130 without the need for querying network repository 110.

When flooding TEP 130 receives the encapsulated reply packet, at 228, it can determine the location of the tunnel endpoint that sent the encapsulated reply packet, which is control plane TEP 120 in this scenario. In at least one embodiment, the location can be determined by gleaning a network address from the outer header of the reply packet. Flooding TEP 130 can decapsulate the reply packet to determine endpoint identifiers of a source and a destination of the network traffic, which in this scenario are host B and host A, respectively.

Once flooding TEP 130 determines the address mapping information of host B and control plane TEP 120, then flooding TEP 130 may update address mapping store 133 with the address mapping information. Accordingly, subsequent network traffic that is received by flooding TEP 130 from any of its attached hosts, and that is addressed to host B, can be encapsulated and sent directly to control plane TEP 120 without sending a multicast packet to search for the appropriate tunnel endpoint. At 230, flooding TEP 130 can forward the reply packet to host A.

In another possible scenario, if network repository 110 does not have address mapping information for host B and its corresponding tunnel endpoint (e.g., registration did not occur at 204), then intercept TEP 150 may simply discard the packet. In this case, address mapping information of host A and flooding tunnel endpoint 130 is stored in network repository 110, due to the registration at 210. Eventually, the tunnel endpoints that participate in the control plane based overlay will either send a message to host A (from one of their attached hosts) or register their own address mapping information with network repository 110. Each of these cases, enables host A to communicate with hosts attached to those tunnel endpoints. In the former case, host A can communicate to a host attached to a particular tunnel endpoint by gleaning a network address from a packet it receives from that tunnel endpoint. In the latter case, host A can communicate to a host attached to a particular tunnel endpoint by sending another multicast packet to intercept TEP 150.

Turning to FIG. 3, FIG. 3 is a simplified block diagram of another embodiment of a communication system for providing interoperability of data plane based overlays and control plane based overlays in a network environment. Communication system 300 illustrates an embodiment using a push mechanism in the control plane based overlay. FIG. 3 includes a flooding tunnel endpoint (flooding TEP) 330, an intercept tunnel endpoint (intercept TEP) 350, and a control plane tunnel endpoint (control plane TEP) 320. Flooding tunnel endpoint 330 implements a flooding protocol 332 and may have an address mapping store 333. Control plane tunnel endpoint 320 and intercept tunnel endpoint 350 may implement, respectively, push control protocols 322 and 352. Control plane tunnel endpoint 320 may also include an address mapping store 323. Intercept tunnel endpoint 350 may also include a flooding emulator module 354 and an address mapping store 353. One or more hosts $342_{1-x}$ may be connected to control plane tunnel endpoint 320, and one or more other hosts $343_{1-y}$ may be connected to flooding tunnel endpoint 330. For ease of reference and where appropriate, an example host of hosts $342_{1-x}$ may be referred to as host 342, and an example host of hosts $343_{1-y}$ may be referred to as host 343.

Intercept TEP 350 and control plane TEP 320 may establish and use a control plane having a communication path 316 to exchange control plane communications. A data plane having communication paths 315a and 315b can be established for communications between flooding TEP 130 and intercept TEP 350, and between intercept TEP 350 control plane TEP 320. A communication path 315c may be established between control plane TEP 320 and flooding TEP 330, when address mapping information of these tunnel endpoints and their attached hosts have been learned. Each tunnel endpoint 320, 330, and 350 can also include, but is not limited to, appropriate hardware such as processors 327, 337, and 357, and memory elements 329, 339, and 359.

Generally, components of communication system 300 may be configured the same as or similar to components described with reference to communication system 100 of FIG. 1. However, control protocols with a push mechanism, rather than a pull mechanism, may be implemented in control plane TEP 320 and intercept TEP 350 of communication system 300.

Control protocols with a pull mechanism were described with reference to communication system 100 of FIGS. 1 and 2.

In at least one embodiment, a new network overlay is created in communication system 300 in which some components use a flooding protocol and some components use a control protocol. This new network overlay enables interoperability between a control plane based overlay, created by components having a control protocol, and a data plane (or flood) based overlay, created by components having a flooding protocol.

In communication system 300, one or more flooding tunnel endpoints, such as flooding TEP 330, implement a flooding protocol such as flooding protocol 332, as described with reference to communication system 100. Flooding TEP 330, and its components, can be configured and operate in the same or substantially similar manner as described with reference to flooding TEP 130 of FIGS. 1 and 2.

Communication system 300 includes a control plane based overlay defined by one or more control plane tunnel endpoints, such as control plane TEP 320, and at least one intercept tunnel endpoint, such as intercept TEP 350. In at least one embodiment, control plane TEP 320 and intercept TEP 350 each implement a control protocol, including the same type of encapsulation used by flooding TEP 330. A control protocol may be implemented as hardware, software, firmware, or any suitable combination thereof.

In the example embodiment of FIG. 3, control protocols in control plane TEP 320 and intercept TEP 350 implement a pushing mechanism for enabling tunnel endpoints that participate in the control plane based overlay to learn the topology of the network. This topology may be learned using a control plane with communication paths, such as path 316. The control plane may be used to distribute address mapping information of hosts and their corresponding tunnel endpoints to other tunnel endpoints.

In a push control protocol, when a tunnel endpoint learns about the local presence of a host, such as host 342, it can advertise it using a routing protocol in the control plane. The advertising can result in a broadcast of the information to tunnel endpoints directly participating in the overlay, such as control plane TEP 320 and intercept TEP 350.

By way of illustration, when control plane TEP 320 learns about a local presence of host 342, control plane TEP 320 can build a network protocol update that includes address mapping information of control plane TEP 320 and the host (or hosts) connected to it. A control protocol message containing the protocol update may be pushed to other tunnel endpoints via the control plane, using any commonly known routing protocol. Possible routing protocols could include any exterior gateway protocols (EGPs) or interior gateway protocols (IGPs), which can include, but are not limited to, VRF Distribution Protocol (VDP), Border Gateway Protocol (BGP), Open Shortest Path First (OSPF), or Intermediate System to Intermediate System (IS-IS) protocol.

If the information is 'pushed' everywhere, tunnel endpoints can have the same reachability information. When a tunnel endpoint needs reachability information for a remote host, the tunnel endpoint can determine whether it has already received the information by searching a designated storage element, such as a local database (e.g., address mapping store 323, 353). In other words, the information can be 'pushed' to tunnel endpoints participating in the control plane based overlay, and the tunnel endpoints can then count on any reachability information being available to them locally.

A designated storage element of tunnel endpoints with a push control protocol, can be configured as an address mapping store containing address mapping information of hosts and their corresponding tunnel endpoints. For example, control plane TEP 320 can include address mapping store 323, and intercept TEP 350 can include address mapping store 353. In at least one embodiment, address mapping stores of tunnel endpoints with a push control protocol, such as 323 and 353, and mapping techniques used therein, may be configured in the same or similar manner as described with reference to address mapping store 133 of flooding TEP 130 in FIG. 1.

In intercept TEP 350, flooding emulator module 354 may cooperate with push control protocol 352 to achieve interoperability between the flood based overlay and the control plane based overlay. Intercept TEP 350 can intercept network traffic being multicast from flooding tunnel endpoints, such as flooding TEP 330, that are connected to intercept TEP 350. Intercept TEP 350 can decapsulate an intercepted packet to determine address mapping information of a source host of the packet and its corresponding flooding tunnel endpoint. In at least one embodiment, intercept TEP 350 can advertise the address mapping information through communication paths of the control plane, such as path 316.

Intercept TEP 350 may search its own address mapping store 353 to obtain a location of a tunnel endpoint corresponding to a destination host identified in an intercepted packet. In at least one embodiment, if address mapping information of the destination host and its corresponding tunnel endpoint has previously been advertised, then the location of the corresponding tunnel endpoint may be obtained from address mapping store 353, and intercept TEP 350 can repackage the packet with that location. For example, assume host $343_1$ sends a packet to host $342_1$, and assume a MAC address of host $342_1$ and an IP address of its corresponding tunnel endpoint, control plane TEP 320, have already been advertised through the control plane. In this example scenario, when intercept TEP 350 intercepts the packet, intercept TEP 350 can decapsulate the packet and search address mapping store 353 for address mapping information. The search can be based on the MAC address of the destination host $342_1$, which is gleaned from the packet's inner header. Intercept TEP 350 may then find the address mapping information containing the IP address of control plane TEP 320, repackage the packet with the IP address, and send the packet to control plane TEP 320 via communication path 315b of the data plane.

In at least one embodiment, the control plane based overlay and the data plane based overlay of communication system 300 are established using the same type of encapsulation for network traffic, in the same or similar manner as described with reference to communication system 100 of FIG. 1. In at least one embodiment, for example, the encapsulation could be some type of Internet Protocol (IP) encapsulation, as previously described herein.

FIGS. 4A and 4B show an interaction diagram illustrating interactions associated with at least one embodiment of communication system 300, which provides interoperability between a flood based overlay and a control plane based overlay. The example of FIGS. 4A and 4B is merely an example of potential interactions, and does not limit the scope of the claims. For example, number of modules may vary, number of components may vary, specific interactions may vary, order of interactions may vary, etc.

The example of FIGS. 4A and 4B illustrates an example of interactions between host 343 (referred to as 'host C' for ease of illustration), flooding TEP 330, intercept TEP 350, control plane TEP 320, and host 342 (referred to as 'host D' for ease of illustration). Initially, when tunnel endpoints of communication system 300 come online, they are made aware of attached hosts in the network. At 402, control plane TEP 320 comes online and learns an endpoint identifier (EID) of attached hosts, such as host D. This learning can be accomplished using any number of techniques, as previously described herein with reference to FIGS. 2A and 2B.

When control plane TEP 320 learns the EID of host D, at 404, control plane TEP 320 can advertise address mapping information to other tunnel endpoints in the network, including intercept TEP 350. For example, control plane TEP 320 could issue a control protocol message containing the address mapping information. Control plane TEP 320 could advertise or push the control protocol message through the control plane. The control protocol message could result in a broadcast of the information to tunnel endpoints participating in the control plane based overlay, including intercept TEP 350. Address mapping information can include an endpoint identifier of host D mapped to a location of the tunnel endpoint requesting the registration, which is control plane TEP 320 in this scenario. In at least one embodiment, the endpoint identifier of host D could be a MAC address, and the location of control plane TEP 320 could be an IP address. Although advertisement of address mapping information by control plane TEP 320 is indicated in the interaction diagram of FIGS. 4A and 4B as occurring before other interactions, in other scenarios, this advertisement may not occur until after certain other interactions shown in FIGS. 4A and 4B.

At 406, host C sends a packet that includes an endpoint identifier of the destination of the packet, host D. In at least one embodiment, the packet is one of one or more packets of network traffic created by host C to send a message to host D. In at least one embodiment, an endpoint identifier of host D may be encapsulated in an inner header of the packet. When flooding TEP 330 receives the packet from host C, it prepares the packet for multicast flooding. In at least one embodiment, flooding TEP 330 encapsulates the packet by adding an outer header with a multicast destination address and its own network address to indicate the location that sent the encapsulated packet. Then, at 408, flooding TEP 330 attempts to flood the network by sending the packet with the multicast address via communication path 315a of the data plane.

Intercept TEP 350 intercepts the multicast packet. Intercept TEP 350 can determine the location of the tunnel endpoint that sent the multicast packet, which is flooding TEP 330 in this scenario. In at least one embodiment, the location can be determined by gleaning a network address from an outer header of the packet. Intercept TEP 350 can decapsulate the packet to determine an endpoint identifier of the source of the network traffic, which is host C in this scenario. Once intercept TEP 350 determines the address mapping information of host C and flooding TEP 330, then at 410, intercept TEP 350 can advertise (or push) address mapping information, through the control plane, to other tunnel endpoints in the network that participate in the control plane based overlay, such as control plane TEP 320. In an embodiment, the advertisement could be in the form of a control protocol message broadcast to the other tunnel endpoints.

Intercept TEP 350 can also examine the decapsulated packet to determine an endpoint identifier of the destination of the network traffic, which is host D in this scenario. At 412, intercept TEP 350 can search its own address mapping store 353 to determine whether address mapping information of host D and its corresponding tunnel endpoint is known. In this example interaction scenario, control plane TEP 320 previously advertised, at 404, address mapping information of host D and control plane TEP 320. Thus, the address mapping information was pushed to intercept TEP 350 at 404, and may be found when address mapping store 353 is searched.

Intercept TEP 350 can determine the location of control plane TEP 320 from the address mapping information found in address mapping store 353. Intercept TEP 350 can encapsulate the packet with the location of control plane TEP 320. In at least one embodiment, encapsulation can include adding an outer header to the packet, with the outer header containing the location of control plane TEP 320. At 414, intercept TEP 350 can send the encapsulated packet to control plane TEP 320 via communication path 315b of the data plane.

When control plane TEP 320 receives the encapsulated packet, it can decapsulate the packet to identify the particular host that is the destination of the packet. At 416, control plane TEP 320 can forward the packet to the identified host, which is host D in this interaction scenario.

At 418, host D may send a reply packet to host C. The reply packet may include an endpoint identifier of host C as the destination. In at least one embodiment, the reply packet can be one of one or more packets of network traffic created by host D to send a reply to host C. In other interaction scenarios, the network traffic could be a message from host D to host C that is not necessarily associated with any previous communication from host C to host D.

When control plane TEP 320 receives the packet, it can identify host C as the destination of the reply packet. At 420, control plane TEP 320 can search address mapping store 323 to determine whether address mapping information for host C and its corresponding tunnel endpoint is known. In this example interaction scenario, intercept TEP 350 previously advertised, at 410, address mapping information of host C and flooding TEP 330. Thus, the address mapping information was pushed to control plane TEP 320 at 410, and may be found when address mapping store 323 is searched.

Control plane TEP 320 can determine the location of flooding TEP 330 from the address mapping information found in address mapping store 323. Control plane TEP 320 can prepare the reply packet to be sent directly to flooding TEP 330 by encapsulating the packet with the location of flooding TEP 330. In at least one embodiment, the encapsulation can include adding an outer header to the reply packet, with the outer header containing a network address of flooding TEP 330. At 422, control plane TEP 320 can send the encapsulated reply packet directly to flooding TEP 330 via communication path 315c of the data plane.

When flooding TEP 330 receives the encapsulated reply packet, at 424, it can determine the location of the tunnel endpoint that sent the encapsulated reply packet, which is control plane TEP 320 in this scenario. In at least one embodiment, the location can be determined by gleaning a network address of control plane TEP 320 from an outer header of the reply packet. Flooding TEP 330 can decapsulate the reply packet to determine endpoint identifiers of a source and a destination of the network traffic, which are host D and host C, respectively, in this scenario.

Once flooding TEP 330 determines the address mapping information of host D and control plane TEP 320, then flooding TEP 330 may update its address mapping store 333 with the address mapping information. Accordingly, subsequent network traffic that is received by flooding TEP 330 from any of its attached hosts, and that is addressed to host D, can be encapsulated and sent directly to control plane TEP 320, through the data plane, without sending a multicast packet to search for the appropriate tunnel endpoint. At 426, flooding TEP 330 can forward the reply packet to host C.

In another possible scenario, if intercept TEP 350 does not find address mapping information for host D and its corresponding tunnel endpoint at 412 (e.g., advertisement did not occur at 404), then intercept TEP 350 may simply discard the packet. In this case, address mapping information of host C and flooding tunnel endpoint 330 is known in tunnel endpoints that participate in the control plane based overlay, due to the advertisement at 410. Eventually, those tunnel endpoints will either send a message to host C (from one of their attached hosts) or advertise their own address mapping information. Each of these cases enables host C to communicate with hosts attached to the tunnel endpoints. In the former case, host C can communicate to a host attached to a particular tunnel endpoint when flooding TEP 330 gleans a network address of the tunnel endpoint from a packet it receives from that tunnel endpoint. In the latter case, host C can communicate to a host attached to a particular tunnel endpoint by sending another multicast packet to intercept TEP 350.

Figure 5:
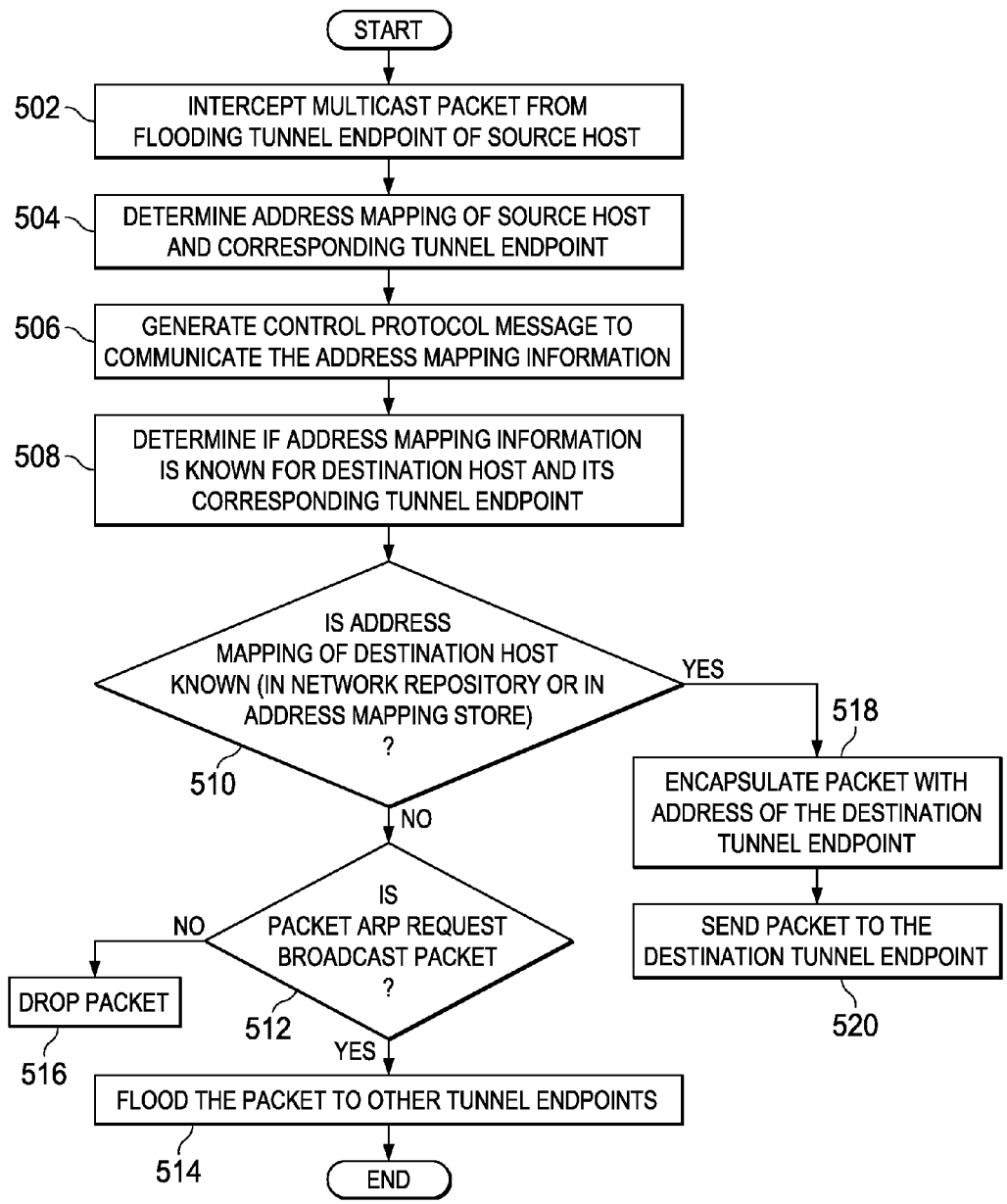
FIG. 5 is a flowchart illustrating activities associated with providing interoperability of network overlays according to at least one embodiment.

Turning to FIG. 5, FIG. 5 is a flow chart illustrating activities associated with embodiments for providing interoperability between a data plane (or flooding) based overlay and a control plane based overlay. In at least one embodiment, a set of operations corresponds to the activities of FIG. 5. In an example, a tunnel endpoint, such as intercept TEP 150 of FIG. 1, may perform one or more operations of the set of operations. This intercept tunnel endpoint may comprise means, including for example, processor 157, for performing such operations. In at least one embodiment, flooding emulator 154 and/or push control protocol 152 of intercept TEP 150 are configured to perform, when executed by a processor, one or more operations of the set of operations.

In another example, a tunnel endpoint such as intercept TEP 350 of FIG. 3, may perform one or more operations of the set of operations. This intercept tunnel endpoint may comprise means, including for example, processor 357, for performing such operations. In at least one embodiment, flooding emulator module 354 and/or push control protocol 352 of intercept tunnel endpoint 350 are configured to perform, when executed by a processor, one or more operations of the set of operations.

At block 502, an intercept tunnel endpoint intercepts a multicast packet from a flooding tunnel endpoint attached to a host that is the source of the network traffic (referred to as 'source host' for ease of illustration). The packet is encapsulated in a header that has a multicast address as its destination. VXLAN encapsulation may be used in at least one embodiment. The multicast packet can include an endpoint identifier of the source host and a location of its corresponding flooding tunnel endpoint. In at least one embodiment, the endpoint identifier of the source host can be a MAC address or an IP address, and the location can be an IP address of the flooding tunnel endpoint attached to the source host. In an embodiment, the flooding tunnel endpoint could be a virtual switch used by a hypervisor hosting the source host. Rather than forwarding the multicast packet using the multicast address, at 504, the intercept tunnel endpoint decapsulates the packet and extracts the endpoint identifier of the source host and the location of the flooding tunnel endpoint from inner and/or outer headers of the packet.

At 506, the intercept tunnel endpoint generates a control protocol message to communicate address mapping information of the source host and its corresponding flooding tunnel endpoint, through the control plane in the communication system. Any overlay control protocol (including control protocols not currently known but subsequently developed) could be implemented in the communication system and used to send control protocol messages. For example, the overlay control protocol could be a push control protocol in which the control protocol message is pushed to tunnel endpoints that participate in the control plane based overlay. The tunnel endpoints could then store the address mapping information of the source host and its flooding tunnel endpoint to use for subsequent outgoing communications to the source host. In another example, the overlay control protocol could be a pull control protocol in which the control protocol message is pushed to a network repository to store the address mapping information. Other tunnel endpoints that participate in the control plane based overlay can then pull the address mapping information from the network repository, as needed, to communicate with the source host.

At 508, a determination may be made as to whether address mapping information is known for the destination host of the multicast packet. When the packet is decapsulated, the intercept tunnel endpoint may also extract an endpoint identifier of the host that is identified as the destination of the packet. Depending upon the particular control protocol, and upon the prior activities of the destination host and its corresponding tunnel endpoint, address mapping information of the destination host and its corresponding tunnel endpoint may have already been communicated in a control protocol message through the control plane. For example, in a push control protocol, address mapping information of the destination host and its corresponding tunnel endpoint may have already been pushed to the intercept tunnel endpoint, and stored in a local address mapping store. Thus, the intercept tunnel endpoint could search the address mapping store to determine whether address mapping information of the destination host is known. In another example, in a pull control protocol, address mapping information of the destination host and its corresponding tunnel endpoint may have already been registered with a network repository. Thus, the intercept tunnel endpoint could query the network repository to determine whether address mapping information of the destination host is known.

If address mapping information of the destination host is known, as determined at 510 (e.g., in a local address mapping store, in a network repository), then the intercept tunnel endpoint has determined the endpoint identifier of the destination host and the location of its corresponding tunnel endpoint (referred to as 'destination tunnel endpoint' for ease of illustration). At 518, the intercept tunnel endpoint can encapsulate the packet with the location of the destination tunnel endpoint. At 520, the intercept tunnel endpoint can send the encapsulated packet to the destination tunnel endpoint.

However, if address mapping information of the destination host is not known, then treatment of the packet may optionally depend on its type. Accordingly, in at least one embodiment, at 512, a determination is made as to whether the packet is an Address Resolution Protocol (ARP) broadcast packet. If the packet is not an ARP packet, then the packet can be dropped at 516. Once the destination host and its tunnel endpoint are learned in the system, subsequent packets can be forwarded to them.

If the packet is an ARP packet, however, then the packet may be attempting to determine a hardware address (e.g., a MAC address) of the destination host. In this case, optionally, the packet could be flooded to other tunnel endpoints. Flooding the ARP packet could trigger a response by the destination host to cause its corresponding tunnel endpoint to generate a control protocol message. The control protocol message could be configured, for example, to cause address mapping information to be registered or advertised, based on the particular control protocol implementation, such that the destination host and its corresponding tunnel endpoint become a known destination.

Figure 6:
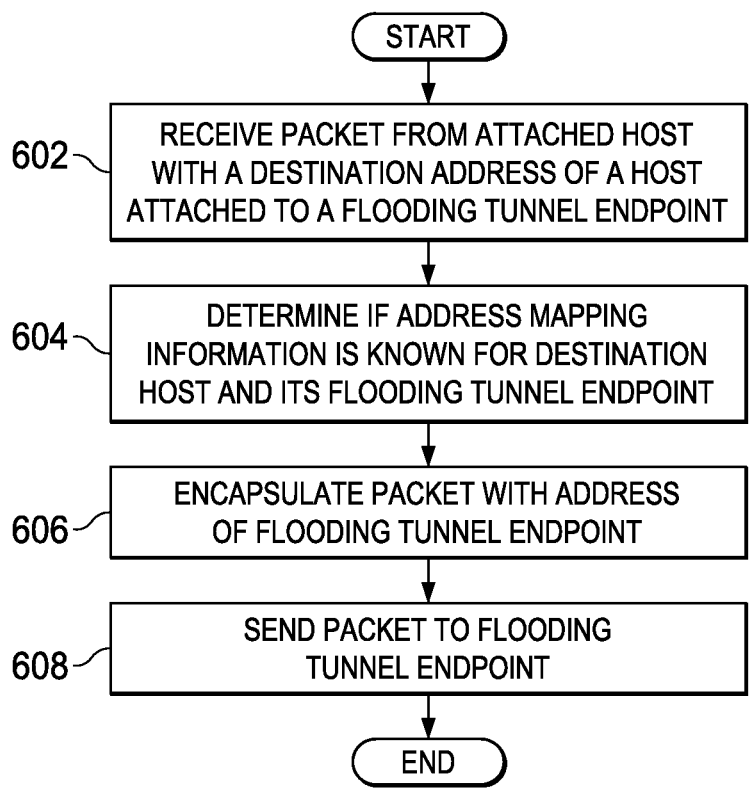
FIG. 6 is another flowchart illustrating further activities associated with providing interoperability of network overlays according to at least one embodiment.

FIG. 6 is a flow chart illustrating activities associated with embodiments for providing interoperability between a data plane (or flooding) based overlay and a control plane based overlay. In at least one embodiment, a set of operations corresponds to the activities of FIG. 6. In an example, a tunnel endpoint, such as control plane TEP 120 of FIG. 1, may perform one or more operations of the set of operations. This control plane tunnel endpoint may comprise means, including for example, processor 127, for performing such operations. In at least one embodiment, pull control protocol 122 of control plane TEP 120 is configured to perform, when executed by a processor, one or more of the operations in the set of operations.

In another example, a tunnel endpoint such as control plane TEP 320 of FIG. 3, may perform one or more operations of the set of operations. This control plane tunnel endpoint may comprise means, including for example, processor 327, for performing such operations. In at least one embodiment, push control protocol 322 of control plane TEP 320 is configured to perform, when executed by a processor, one or more operations of the set of operations.

At 602, a control plane tunnel endpoint receives a packet from an attached host. The packet includes an endpoint identifier of a host that is the destination of the packet (referred to as 'destination host' for ease of illustration). The destination host may be attached to a flooding tunnel endpoint, such as flooding TEP 130 or 330.

At 604, a determination may be made as to whether address mapping information for the destination host of the packet is known. Depending upon the particular control protocol, and upon the prior activities of the destination host and its corresponding flooding tunnel endpoint, address mapping information of the destination host and the flooding tunnel endpoint may have already been provided in a control protocol message communicated through the control plane from an intercept tunnel endpoint. For example, in a push control protocol, address mapping information of the destination host and its flooding tunnel endpoint may have already been pushed to the control plane tunnel endpoint by the intercept tunnel endpoint, and stored in a local address mapping store. Thus, the control plane tunnel endpoint could search the address mapping store to determine whether address mapping information of the destination host is known. In another example, in a pull control protocol, address mapping information of the destination host and its flooding tunnel endpoint may have already been registered with a network repository by an intercept tunnel endpoint. Thus, the control plane tunnel endpoint could query the network repository to determine whether network address mapping information of the destination host is known.

If address mapping information of the destination host is known (e.g., in a local address mappings store, in a network repository), then the control plane tunnel endpoint can determine the location of the flooding tunnel endpoint corresponding to the destination host. At 606, the control plane tunnel endpoint can encapsulate the packet with the location of the flooding tunnel endpoint. At 608, the control plane tunnel endpoint can send the encapsulated packet directly to the flooding tunnel endpoint, without necessarily being routed through the intercept tunnel endpoint.

If address mapping information of the destination host is not known, however, then, in at least one embodiment, the packet can be dropped. Once the endpoint identifier of the host and the location of its corresponding flooding tunnel endpoint are learned in the system, subsequent packets can be forwarded to them.

Note that in certain example implementations, the interoperability functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor or other similar machine, instructions in software, hardware, firmware, or any combination thereof, etc.). This tangible media may be non-transitory in at least one embodiment. In some of these instances, one or more memory elements (as shown in FIGS. 1-4) can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor (as shown in FIGS. 1 and 3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In at least one example implementation, tunnel endpoints of embodiments of a communication system, such as communication systems 100 and 300, may include logic in order to achieve the interoperability functions outlined herein. These activities can be facilitated by various modules (e.g., flooding emulator module 154, 354, pull control protocols 122, 152, push control protocols 322, 352, flooding protocols 132, 332), which can be suitably combined in any appropriate manner, or partitioned in any appropriate manner, and which may be based on particular configuration and/or provisioning needs. Additionally, these network elements may include a processor (e.g., processors 127, 137, 157, 327, 337, 357) that can execute software, an algorithm, or other instructions to perform the interoperability operations, as disclosed herein. These network elements may further keep information, to be used in achieving the interoperability activities as discussed herein, in any suitable memory element (random access memory (RAM), read only memory (ROM), EPROM, EEPROM, ASIC, etc.), software, hardware, or in any other suitable component, device, element, or object where appropriate and based on particular needs. Any of the memory items discussed herein (e.g., repositories, stores, databases, tables, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100 and/or 300 and their teachings are readily scalable and can accommodate a large number of components, as well as more complicated/sophisticated arrangements and configurations. Accordingly, the examples provided should not limit the scope or inhibit the broad teachings of communication systems 100 and/or 300 as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. The use of these terms is not intended to indicate any type of order, rank, importance, temporal sequence, or hierarchy of the modified noun. For example, 'first X' and 'second X' are intended to designate two separate X elements, that are not necessarily limited by any order, rank, importance, temporal sequence, or hierarchy of the two elements.

It is also important to note that the activities, interactions, and operations in the preceding flow diagrams illustrate only some of the possible interoperability scenarios and patterns that may be executed by, or within, embodiments of communication systems 100 and 300. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by communication systems 100 and 300 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100 and 300 have been illustrated with reference to particular elements and operations that facilitate the communication process, these elements and operations may be replaced by any suitable architecture, protocols, and/or processes that achieve the intended functionality of communication systems 100 and 300.

What is claimed is:

1. A method, comprising:
   intercepting a packet being multicast from a first tunnel endpoint in a network;
   determining first address mapping information of the first tunnel endpoint and a first host, wherein the first host created the packet;
   generating a control protocol message with the first address mapping information; and
   communicating the control protocol message through a control plane in the network.

2. The method of claim 1, wherein the communicating the control protocol message includes sending the control protocol message to a network repository, wherein the first address mapping information is registered in the network repository.

3. The method of claim 1, wherein the communicating the control protocol message includes pushing the control protocol message to one or more other tunnel endpoints.

4. The method of claim 1, wherein a second tunnel endpoint corresponding to a second host receives the first address mapping information through the control plane, wherein the second host is identified in the packet as a destination of the packet.

5. The method of claim 4, further comprising:
   determining whether second address mapping information of the second host and the second tunnel endpoint is known; and
   sending the packet to the second tunnel endpoint if the second address mapping information is known.

6. The method of claim 5, wherein the determining whether the second address mapping information is known includes one of querying a network repository and searching a local address mapping store.

7. The method of claim 5, further comprising:
   encapsulating the packet, before the packet is sent, with a location of the second tunnel endpoint.

8. The method of claim 4, wherein the second tunnel endpoint determines whether the first address mapping information is known when the second tunnel endpoint receives a second packet from the second host with the first host identified in the second packet as a destination of the second packet.

9. The method of claim 8, wherein the second tunnel endpoint sends the second packet directly to the first tunnel endpoint, if the second tunnel endpoint determines the first address mapping information is known.

10. The method of claim 1, wherein the determining the first address mapping information includes decapsulating the packet to determine an endpoint identifier of the first host and a location of the first tunnel endpoint.

11. The method of claim 1, wherein the first tunnel endpoint is one of a virtual switch and a physical switch, and wherein the second tunnel endpoint is one of a virtual switch and a physical switch.

12. At least one non-transitory, machine readable storage medium having instructions stored therein, the instructions when executed by a processor cause the processor to:
    intercept a packet being multicast from a first tunnel endpoint in a network;
    determine first address mapping information of the first tunnel endpoint and a first host, wherein the first host created the packet; and
    generate a control protocol message with the first address mapping information; and
    communicate the control protocol message through a control plane in the network.

13. The medium of claim 12, further comprising instructions that when executed by a processor cause the processor to:
    send the control protocol message to a network repository, wherein the first address mapping information is registered in the network repository.

14. The medium of claim 12, further comprising instructions that when executed by a processor cause the processor to:
    push the control protocol message to one or more other tunnel endpoints.

15. The medium of claim 12, further comprising instructions that when executed by a processor cause the processor to:
- determine the first address mapping information by decapsulating the packet to identify the first host and a network address of the first tunnel endpoint.

16. An apparatus, comprising:
- at least one memory element having instructions stored therein; and
- at least one processor, wherein the instructions when executed by the at least one processor, cause the processor to:
  - intercept a packet being multicast from a first tunnel endpoint in a network;
  - determine first address mapping information of the first tunnel endpoint and a first host, wherein the first host created the packet; and
  - generate a control protocol message with the first address mapping information; and
  - communicate the control protocol message through a control plane in the network.

17. The apparatus of claim 16, wherein a second tunnel endpoint corresponding to a second host is configured to receive the first address mapping information through the control plane, wherein the second host is identified in the packet as a destination of the packet.

18. The apparatus of claim 17, wherein the instructions when executed by the processor, further cause the processor to:
- determine whether second address mapping information of the second host and a second tunnel endpoint is known; and
- send the packet to the second tunnel endpoint if the second address mapping information is known.

19. The apparatus of claim 18, wherein the instructions when executed by the processor, further cause the processor to:
- encapsulate the packet, before the packet is sent, with a location of the second tunnel endpoint.

20. The apparatus of claim 18, wherein the packet is sent via a data plane in the network.

* * * * *